United States Patent Office 3,466,342
Patented Sept. 9, 1969

3,466,342
**PREPARATION OF 1,1,2,2,3-PENTA-
BROMOPROPANE**
Richard T. Dickerson, Midland, Mich., assignor to The
Dow Chemical Company, Midland, Mich., a corporation of Delaware
No Drawing. Filed Dec. 9, 1965, Ser. No. 512,770
Int. Cl. C07c 17/10, 17/04
U.S. Cl. 260—658                               3 Claims

ABSTRACT OF THE DISCLOSURE 1,1,2,2,3-pentabromopropane is the principal product obtained when 2-bromopropene, 2,2-dibromopropane, or 1,2,2-tribromopropane is brominated by adding it to an excess of liquid bromine in the presence of an iron halide. Bromination in the reverse order by adding bromine to the starting compound yields a mixture of the pentabromopropane and a tetrabromopropane.

---

This invention relates to a new and advantageous method for making the compound 1,1,2,2,3-pentabromopropane.

This compound has been made before by methods which employed costly starting materials such as propargyl bromide and 1,2,3-tribromopropene, both of which are also strongly lachrymatory and highly toxic. The present method is advantageous in that cheap and readily available hydrocarbons such as propylene, methylacetylene, and allene can be used to better advantage as the primary starting materials, in a simplified and more efficient process. This new method provides high yields of the desired compound and avoids the formation of by-products and other isomers.

It has now been found that 2,2-dibromopropane can be reacted with bromine in such a way that better than eighty percent yields of the particular isomer 1,1,2,2,3-pentabromopropane are obtained. This result is provided when the conventional method of adding bromine to a mixture of the compound to be brominated and a bromination catalyst is reversed and the 2,2-dibromopropane is added to excess liquid bromine containing an iron catalyst. The conventional method of bromination produces about equal molar proportions of 1,1,2,2,3-pentabromopropane and 1,2,2,3-tetrabromopropane. The latter compound is resistant to further bromination and when forced to react further by more stringent reaction conditions, the product is largely a hexabromopropane rather than the desired pentabromo compound.

Bromination of other dibromopropanes, for example, either propylene dibromide or trimethylene dibromide, requires relatively drastic conditions to reach the pentabromo stage and the product is largely another isomer, 1, 1, 2, 3, 3-pentabromopropane. The same is true of the bromination of propylidene dibromide and 1,2,3-tribromopropane.

This new process is operated under moderate temperature conditions of about 20–100° C. It is preferably run at about 40–60° C. under substantially atmospheric pressure. Since the excess bromine itself serves as a reaction solvent, the process is preferably run in the absence of a separate reaction solvent although a solvent which is substantially unreactive under process conditions can be employed if desired. The reaction is catalyzed by an iron halogenation catalyst, preferably iron bromide or iron chloride. Conventional catalytic amounts of iron are employed, for example, about 0.001–1 percent by weight of the reaction mixture.

2,2-dibromopropane is readily available from the addition of 2 molecules of HBr to either allene or methylacetylene. It is also easily made from propylene by the addition of HBr in a polar solvent to form isopropyl bromide followed by the vapor phase reaction of isopropyl bromide with bromine at about 100° C. in the absence of iron or other halogenation catalyst.

Instead of 2,2-dibromopropane, the starting material can be 2-bromopropene or its bromine addition product 1,2,2-tribromopropane. 2-bromopropene is available from the addition of one molecule of HBr to either allene or methylacetylene.

Examples 1 and 2 contrast the result obtained by the present invention with that found by using conventional brominating procedure.

EXAMPLE 1

A reactor flask was charged with 55 parts by weight of liquid bromine and 0.03 part of steel wool. The mixture was heated to 50° C. and was maintained at this temperature while 20.2 parts by weight of 2,2-dibromopropane was added portionwise over a period of 30 minutes. The reaction mixture was heated at 50° C. for 20 hours, then the excess bromine was evaporated and the mixture was blown with nitrogen to remove the last of the bromine and hydrogen bromide. The residual oil was taken up in 25 parts by weight of methylene chloride and this solution was washed with water and with aqueous sodium bisulfite. The methylene chloride was evaporated from the washed solution under reduced pressure to obtain 43 parts by weight of a product consisting essentially of 84.7 mole percent 1,1,2,2,3-pentabromopropane, 7.3 mole percent 1,2,2,3-tetrabromopropane, and 8.1 mole percent 1,1,2,2,3,3-hexabromopropane.

EXAMPLE 2

Example 1 was repeated reversing the procedure so that the bromine was added to the 2,2-dibromopropane and iron catalyst in the conventional manner. When the reaction product was worked up as shown above, it was found to be a mixture of 1,1,2,2,3-pentabromopropane and 1,2,2,3-tetrabromopropane in essentially equal molar proportions together with a small quantity of the hexabromopropane previously obtained.

EXAMPLE 3

A mixture of equal molar parts of 1,1,2,2-tetrabromopropane and 1,2,2,3 - tetrabromopropane (36 parts by weight) was added to a mixture of 24 parts of bromine and 0.03 part of ferric chloride at 50° C. according to the procedure of Example 1. After the reaction mixture was further reacted and worked up as described in that example, the product was found to consist essentially of equal molar proportions of 1,1,2,2,3-pentabromopropane and 1,2,2,3-tetrabromopropane. The starting 1,2,2,3-tetrabromopropane component had failed to react to a significant degree under these conditions.

EXAMPLE 4

The procedure of Example 1 is followed to react 12.1 parts by weight of 2-bromopropene with about 55 parts of bromine in the presence of 0.03 part of iron at 50° C. After the product is worked up as in Example 1 it is found to be essentially identical in composition to the product of that example.

EXAMPLE 5

Example 1 is repeated using about 40 parts by weight of bromine and adding to the bromine-iron mixture 28 parts of 1,2,2-tribromopropane. The reaction product thereby obtained is essentially identical to that of Example 1.

The product of this invention, 1,1,2,2,3-pentabromopropane is particularly valuable as a chemical intermediate for making tribromoallyl ethers and other tribromoallyl derivatives by reacting it with the appropriate active hydrogen compound in the presence of an alkali base as shown by Lespieau, Ann. de Chim. et Phys. [7] 11, 232–288 (1897). Such tribromoallyl derivatives are effective flame-retardant additives for polystyrene and similar plastics.

I claim:

1. A process for making 1,1,2,2,3-pentabromopropane which consists essentially of adding to an excess of liquid bromine in the presence of iron chloride or iron bromide a compound selected from the group consisting of 2-bromopropene, 2,2-dibromopropane, and 1,2,2-tribromopropane at a temperature of 20–100° C. said liquid bromine serving as the reaction solvent, and recovering from the resulting reaction mixture 1,1,2,2,3-pentabromopropane as the principal reaction product.

2. The process of claim 1 wherein the compound added to the bromine is 2,2-dibromopropane.

3. The process of claim 2 when carried out at a temperature of 40–60° C.

References Cited

UNITED STATES PATENTS

| | | | |
|---|---|---|---|
| 2,667,518 | 1/1954 | Wrightson et al. | 260—658 X |
| 3,000,980 | 9/1961 | Asadorian et al. | 260—658 |
| 3,268,597 | 8/1966 | Clemons et al. | 260—658 X |

LEON ZITVER, Primary Examiner

J. BOSKA, Assistant Examiner